US009799122B2

(12) United States Patent
Komatsu

(10) Patent No.: US 9,799,122 B2
(45) Date of Patent: Oct. 24, 2017

(54) MOTION INFORMATION ACQUIRING APPARATUS AND MOTION INFORMATION ACQUIRING METHOD

(71) Applicant: CANON KABUSHIKI KAISHA, Tokyo (JP)

(72) Inventor: Satoru Komatsu, Mansfield Center, CT (US)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 15/059,412

(22) Filed: Mar. 3, 2016

(65) Prior Publication Data
US 2016/0267677 A1 Sep. 15, 2016

(30) Foreign Application Priority Data

Mar. 9, 2015 (JP) ................. 2015-046251

(51) Int. Cl.
*G06K 9/00* (2006.01)
*G06T 7/20* (2017.01)
(Continued)

(52) U.S. Cl.
CPC .............. *G06T 7/20* (2013.01); *G06K 9/2027* (2013.01); *G06K 9/4652* (2013.01);
(Continued)

(58) Field of Classification Search
CPC .......... G06T 7/20; H04N 5/145; H04N 5/144; H04N 5/2354; G06K 9/4661; G06K 9/2027; G06K 9/4652
See application file for complete search history.

(56) References Cited

U.S. PATENT DOCUMENTS 3,942,022 A * 3/1976 Stumpf ................. G01P 3/806
250/208.1
9,100,561 B2    8/2015 Komatsu
(Continued)

FOREIGN PATENT DOCUMENTS

JP    2004-101478 A    4/2004
JP    2008-096387 A    4/2008
(Continued)

OTHER PUBLICATIONS

Extended European Search Report dated Jul. 27, 2016, issued in corresponding European Patent Application No. 16154200.6-1902.
(Continued)

*Primary Examiner* — John Strege
(74) *Attorney, Agent, or Firm* — Fitzpatrick, Cella, Harper & Scinto

(57) ABSTRACT

A motion information acquiring apparatus includes: a lighting device that illuminates an object at the same time with first intensity-modulated light, second intensity-modulated light, and constant illumination light, wherein the first and second intensity-modulated light are intensity modulated with reference signals having substantially same wavelength but different phase; an image generator that generates first to third images corresponding to the first intensity-modulated light, the second intensity-modulated light, and the constant illumination light; and a motion information acquirer that acquires motion information in the images on the basis of the first to third images.

20 Claims, 9 Drawing Sheets

(51) Int. Cl.
*H04N 5/14* (2006.01)
*H04N 5/235* (2006.01)
*G06K 9/20* (2006.01)
*G06K 9/46* (2006.01)

(52) U.S. Cl.
CPC ........... *G06K 9/4661* (2013.01); *H04N 5/144* (2013.01); *H04N 5/145* (2013.01); *H04N 5/2354* (2013.01)

(56) References Cited

U.S. PATENT DOCUMENTS

| | | | |
|---|---|---|---|
| 2009/0267781 A1* | 10/2009 | Makinouchi | G01D 5/38 340/635 |
| 2012/0154355 A1 | 6/2012 | Kawai et al. | |
| 2013/0063652 A1 | 3/2013 | Komatsu | |
| 2014/0210999 A1 | 7/2014 | Komatsu | |
| 2015/0042839 A1 | 2/2015 | Komatsu et al. | |
| 2015/0109514 A1 | 4/2015 | Komatsu | |
| 2015/0227815 A1 | 8/2015 | Komatsu | |
| 2015/0235103 A1 | 8/2015 | Komatsu et al. | |

FOREIGN PATENT DOCUMENTS

| | | |
|---|---|---|
| JP | 2013-062582 A | 4/2013 |
| JP | 5441204 B2 | 3/2014 |
| JP | 2014-140117 A | 7/2014 |

OTHER PUBLICATIONS

Kimachi, Akira, et al. "Spectral matching imager using amplitude-modulation-coded multispectral light-emitting diode illumination," Optical Engineering, vol. 43, No. 4, Apr. 1, 2004, pp. 975-985.

Wang, Peizhen, et al. "Motion Clustering and Object Detection via Modulated Integral Imaging," Optical Sensing II, vol. 7513, Nov. 4, 2009.

Wei, D., et al., "Adaptive Optical Flow Detection Using Correlation Image Sensor and Frequency-Tuned Complex-Sinusoidal Reference Signals," Optical Sensing II, vol. 6816, Feb. 14, 2008.

* cited by examiner

MOTION INFORMATION ACQUIRING APPARATUS AND MOTION INFORMATION ACQUIRING METHOD

BACKGROUND OF THE INVENTION

Field of the Invention

The present invention relates to a motion information acquiring apparatus that acquires motion information from an image, and more particularly to a motion information acquiring apparatus that acquires motion information from time-correlation images.

Description of the Related Art

In the field of acquiring motion information located in an image such as an optical flow, motion information is typically acquired from a difference between two continuously captured images. With such a method, since large motions cannot be accurately acquired, motions on images are reduced by performing high-speed imaging. However, a problem arising when high-speed imaging is performed is that an increase in storage capacity and high-speed processing are needed.

Accordingly, a technique for acquiring motion information only with a single imaging operation by acquiring time-correlation images has been investigated. A time-correlation image is an image representing a time correlation between an image signal obtained by the usual imaging and a predetermined reference signal. Patent Document 1 suggests providing a reference signal with respect to a current obtained by photoelectric conversion and using an image capturing element that integrates the modulated current over time and outputs the integrated current in order to acquire a time-correlation image. However, the image capturing element which is used in this method differs in structure from the typically used image capturing elements, and large design changes are required. Therefore, the production cost rises.

Patent Document 2 suggests a method for acquiring time-correlation images by using a general-purpose image capturing element. As suggested in Patent Document 2, when a single image is acquired, a shutter or light quantity modulating element is controlled according to a reference signal and the incident light quantity is modulated. As a result, time-correlation images representing time correlation with the reference signals can be acquired by using a general-purpose image capturing element. However, with this method, the time-correlation images are acquired with the shutter or light quantity modulating element. Therefore, when correlation with a plurality of reference signals is acquired at the same time, the reference signals need to be changed by time division. The resultant problem is that the sampling number of reference signals decreases. Further, the problem arising when the sampling number is increased is that a plurality of light quantity modulating elements and image capturing elements is needed and the apparatus increases in size.

Patent Document 3 suggests a method in which an object is irradiated with light which has been amplitude modulated at a frequency that differs for each wavelength, and components corresponding to the modulation frequency are extracted in order to implement spectral measurements with the light rays of different wavelengths in a single measurement cycle without using a complex spectrometer. The objective of Patent Document 3 is to acquire spectral information, and the acquisition of time-correlation images for motion information acquisition is not considered.

Patent Document 1: Japanese Patent No. 5441204
Patent Document 2: Japanese Patent Application Publication No. 2013-62582
Patent Document 3: Japanese Patent Application Publication No. 2004-101478

SUMMARY OF THE INVENTION

With the foregoing in view, it is an objective of the present invention to provide a technique capable of acquiring high-quality time-correlation images and motion information with a simple apparatus configuration.

A motion information acquiring apparatus according to the first aspect of the present invention includes:

a lighting device that illuminates an object at the same time with first intensity-modulated light which has a first center wavelength and which is intensity-modulated with a first reference signal, second intensity-modulated light which has a second center wavelength and which is intensity-modulated with a second reference signal that has substantially the same wavelength as the first reference signal, but a different phase, and constant illumination light which has a third center wavelength and a constant intensity; an image generator that generates first to third images corresponding to the first intensity-modulated light, the second intensity-modulated light, and the constant illumination light; and a motion information acquirer that acquires motion information in the images on the basis of the first to third images generated by the image generator.

A motion information acquiring method according to another aspect of the present invention is a motion information acquiring method performed by a motion information acquiring apparatus, the method including: an illumination step for illuminating an object at the same time with first intensity-modulated light which has a first center wavelength and which is intensity-modulated with a first reference signal, second intensity-modulated light which has a second center wavelength and which is intensity-modulated with a second reference signal that has substantially the same wavelength as the first reference signal, but a different phase, and constant illumination light which has a third center wavelength and a constant intensity; an image generation step for performing imaging, while illuminating the object with the first intensity-modulated light, the second intensity-modulated light, and the constant illumination light, and generating first to third images corresponding to the first intensity-modulated light, the second intensity-modulated light, and the constant illumination light; and a motion information acquisition step for acquiring motion information in the images on the basis of the first to third images generated in the image generation step.

In accordance with the present invention, high-quality time-correlation images can be acquired and high-quality motion information can be acquired from those time-correlation images with a simple apparatus configuration.

Further features of the present invention will become apparent from the following description of exemplary embodiments with reference to the attached drawings.

DESCRIPTION OF THE EMBODIMENTS

Figure 1:
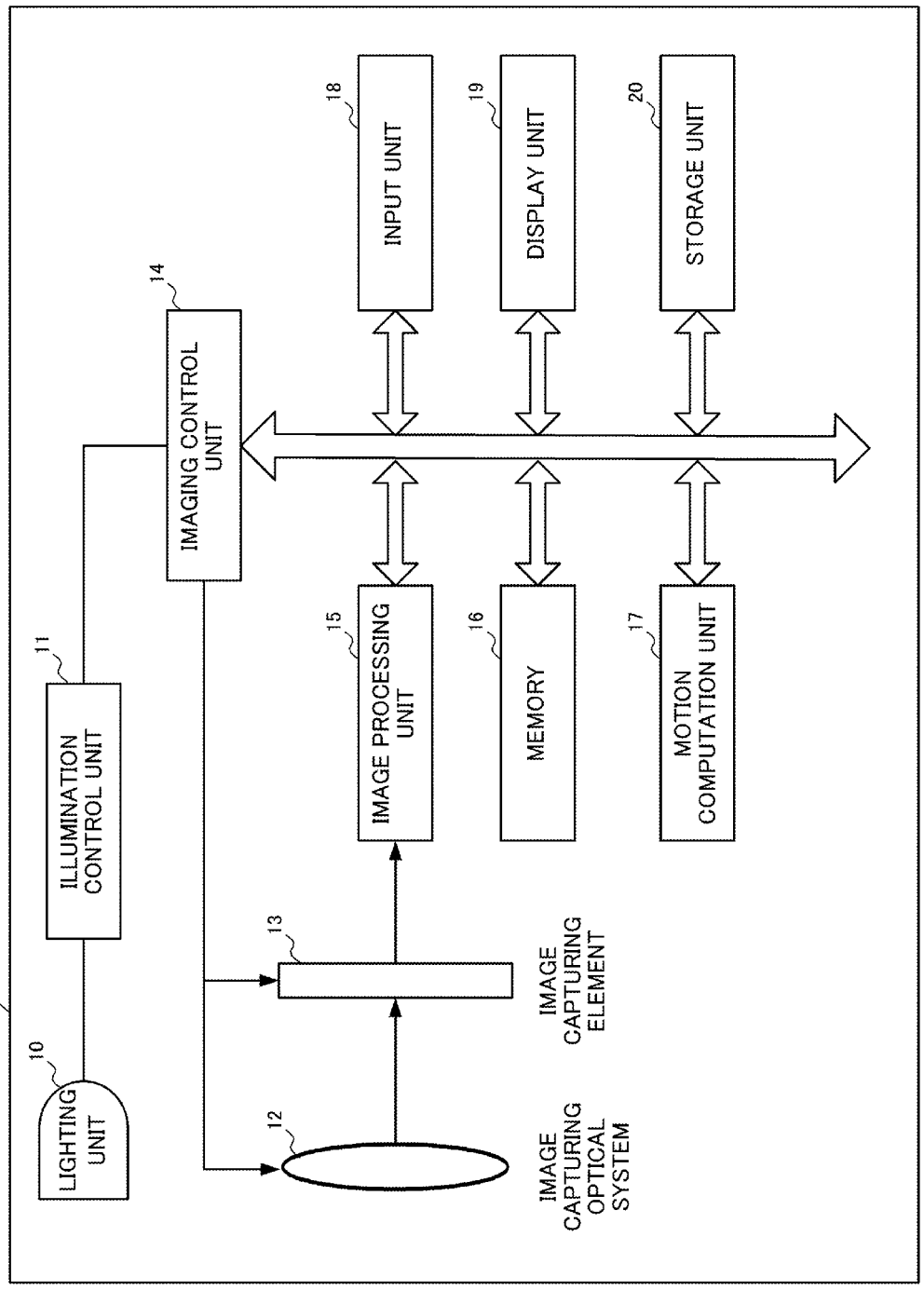
FIG. 1 is a system configuration of an image capturing device according to Embodiment 1.

<Explanation of Time-Correlation Image and Motion Information Acquisition Principle>

Prior to explaining the embodiments of the present invention, the time-correlation image and a method for acquiring motion information (motion vector, optical flow) from the time-correlation images are explained.

[Time-Correlation Image]

A time-correlation image is an image obtained by correlating a usual image generated as a brightness signal by conversion of incident light passing through an image capturing optical system from light into electric charges by an image capturing element, and a reference signal which is supplied from the outside and changes with time. In other words, where the output of an image capturing element in a pixel (i, j) is denoted by $f_{i,j}(t)$, the reference signal is denoted by $g(t)$, and one frame time is denoted by T, the time-correlation image $I_{i,j}(t)$ is represented by the following expression. This is a correlation value of the pixel value within the one frame time and the reference signal which changes with time.

[Math. 1]

$$I_{i,j}(t) = \int_0^T f_{i,j}(t) g(t) dt \tag{1}$$

Expression 1 represents the case in which the reference signal is supplied as an analog signal. Where the reference signal is supplied as a digital signal, a discrete representation is used. The discrete representation of Expression 1 is presented below.

[Math. 2]

$$I_{i,j}(n) = \Sigma_{n=0}^m f_{i,j}(n) g(n) \tag{2}$$

In other words, the time-correlation image can be obtained by multiplying and summing up the output $f_{i,j}$ of the image capturing element and the reference signal value g taken at discrete timings $n\Delta t$ obtained by further dividing the one frame time T by m and separated by a fine interval $\Delta t$. Each frame obtained when an image is captured by dividing the one frame time into fine intervals is taken as a sub-frame, and n is the number of the sub-frame.

Explained hereinabove is the case in which correlation with the reference signal is taken after photoelectric conversion of the incident light with the image capturing element, but a similar time-correlation image can be also outputted by temporally controlling the incident light intensity according to the reference signal.

[Explanation of Motion Vector (Optical Flow) Acquisition]

A method for computing a motion vector by using the above-described time-correlation image is explained hereinbelow.

Where the brightness value at the timing t at a point (x, y) in an image is f(x, y, t) and assumed not to change within the fine interval $\Delta t$, the following expression is valid.

[Math. 3]

$$f(x,y,t) = f(x+\Delta t, y+\Delta t, t+\Delta t) \tag{3}$$

Where Expression 3 is subjected to Taylor expansion and terms of the second and higher orders are ignored, the following expression is valid.

[Math. 4]

$$\frac{d}{dt} f = \frac{\partial f}{\partial x} V_x + \frac{\partial f}{\partial y} V_y + \frac{\partial f}{\partial t} = 0 \tag{4}$$

Here, Vx, Vy are x and y components of a motion vector V at the point (x, y).

Expression 4 is called an optical flow constraint equation, and the motion vector V can be calculated by solving this equation. The problem herein is in a method for acquiring the partial differential term (differentiation by time) in Expression 4. This partial differential term is usually calculated by finding the difference in images between two frames, but large motion is difficult to determine accurately with such a method.

Let us consider an image with a shading value f(x, y, t) exposed over a certain time T. Where Expression 4 is integrated over the time T, the following expression is obtained.

[Math. 5]

$$I_0(x,y) = \int_{-T/2}^{T/2} f(x,y,t) dt = \int_{-T/2}^{T/2} V \cdot \nabla f dt + \int_{-T/2}^{T/2} \partial_t f dt = V \cdot \nabla I_0 + [f]_{-T/2}^{T/2} \tag{5}$$

Let us then consider a time-correlation image for which $\cos(\omega t)$, $\sin(\omega t)$ are taken as reference signals during the exposure. Where a correlation image I(x, y) obtained by combining time-correlation images acquired with two reference signals is considered, the correlation image I(x, y) can be represented by the following expression.

[Math. 6]

$$\begin{aligned} I(x, y) &= \int_{-T/2}^{T/2} f(x, y, t)\cos\omega t\, dt - i \int_{-T/2}^{T/2} f(x, y, t)\sin\omega t\, dt \\ &= \int_{-T/2}^{T/2} f(x, y, t) e^{-i\omega t} dt \\ &= \int_{-T/2}^{T/2} V \cdot \nabla f e^{-i\omega t} dt + \int_{-T/2}^{T/2} \partial_t f e^{-i\omega t} dt \\ &= V \cdot \nabla I + i\omega I + [fe^{-i\omega t}]_{-T/2}^{T/2} \end{aligned} \tag{6}$$

The finally transformed equations in Expression 5 and Expression 6 include the difference between the brightness values f(x, y, t) at the timing T/2 and the timing −T/2. This difference actually cannot be calculated because the image at the timings T/2 and −T/2 is unknown. However, When $\omega T = 2n\pi$ (n: integer), the following expression is valid.

[Math. 7]

$$e^{i\omega T/2} = e^{-i\omega T/2} = (-1)^n \tag{7}$$

In other words, where a sine wave with an integer period is provided during the exposure, the differential terms in Expression 5 and Expression 6 become equal to each other, except for the sign thereof, and the following expression is valid.

[Math. 8]

$$V \cdot \nabla \{(-1)^n I_0(x,y) - I(x,y)\} = i\omega I(x,y) \quad (8)$$

Expression 8 is a complex equation, and a real part equation and an imaginary part equation can be obtained with respect to two unknowns Vx, Vy. The motion vector V can be acquired by solving those equations.

Further, Expression 8 is constituted by a usual intensity image $I_0$ and a time-correlation image I having a cos wave and a sin wave as reference signals. In other words, where the intensity image $I_0$ and the time-correlation image I obtained with the sine wave could be acquired simultaneously in a single image capturing cycle in one frame, the speed vector V could be acquired without the approximation by the difference between two frame images.

In the explanation hereinabove, the reference signal is assumed to be a sine wave (cos wave and sin wave) for the sake of simplicity, but the speed vector can be also calculated in the same manner as described hereinabove by taking as a reference signal a periodic signal of substantially the same shape which has a different phase.

First Embodiment

As described hereinabove, the time-correlation image is obtained as the correlation of a signal obtained from an image capturing element and a reference signal. For example, in Japanese Patent Application Publication No. 2013-62582, the quantity of light incident on an image capturing element is modulated by controlling a shutter or an optical modulation element according to a reference signal. In the embodiments of the present invention, the quantity of light incident on an image capturing element is modulated by using the abovementioned sine reference signal as a modulation signal and modulating the intensity of illumination light falling on an object according to the reference signal. In the present embodiment, a time-correlation image is thus acquired and motion information on the object is acquired on the basis thereof.

<System Configuration>

FIG. 1 is the system configuration of an image capturing device according to the first embodiment of the present invention. An image capturing device 1 has a lighting device 10, an illumination control unit 11, an image capturing optical system 12, an image capturing element 13, an imaging control unit 14, an image processing unit 15, a memory 16, a motion computation unit 17, an input unit 18, a display unit 19, and a storage unit 20.

The lighting device 10 constituted by light sources capable of outputting light with narrow-band spectra, such as a LED or laser, is configured to be capable of outputting a plurality of spectra. The center wavelengths of the spectra are not particularly limited, but it is preferred that a wavelength band from an ultraviolet region to an infrared region be used. In the present embodiment, the lighting device 10 outputs spectra with three difference center wavelengths $\lambda 0$ to $\lambda 2$ which are close to each other.

The illumination control unit 11 controls the modulation of intensity independently for each spectrum according to a reference signal which has been stored in advance or a reference signal inputted by an input device (not depicted in the figure) with respect to the illumination light source in the lighting device 10.

The image capturing optical system 12 is constituted by a plurality of lenses and forms the image of the incident light on the image surface of the image capturing element 13. The image capturing optical system 12 is a variable-focus optical system, and automatic focusing can be performed by an auto-focus function of the imaging control unit 14. The auto-focus system may be passive or active.

The image capturing element 13 has a CCD or CMOS and is configured to be capable of acquiring images with different center wavelengths at the same time. In order to acquire images with different center wavelengths, the image capturing element 13 may have a plurality of different color filters or may be configured to separate wavelengths by using diffraction. It may also be configured to have a plurality of image capturing elements corresponding to different wavelengths, that is, as a three-plate image capturing element. The image capturing element 13 is configured to be capable of acquiring at least spectra corresponding to the spectra with the center wavelengths $\lambda 0$ to $\lambda 2$ which are radiated from the illumination light sources of the lighting device 10 and a spectrum with a center wavelength $\lambda 3$ which does not include the illumination light from the lighting device 10.

The imaging control unit 14 performs control of the entire imaging process, that is, control of the focus and exposure and timing control of illumination and image capturing.

The image processing unit 15 processes the signals outputted from the image capturing element 13. More specifically, the image processing unit performs general processing such as A/D conversion of analog signal, noise removal, demosaicking, brightness signal conversion, aberration correction, white balance adjustment, and color correction and correction processing corresponding to the illumination light source wavelength. Detailed explanation of correction processing is provided later. The digital image data outputted from the image processing unit 15 are temporarily stored in the memory 16 and then subjected to the desired processing, for example, displayed on the display unit 19 and stored (saved) in the storage unit 20.

The motion computation unit 17 acquires motion information on the object in the images by using a plurality of images generated by the image processing unit 15 and stored in the memory 16. The motion information on the object in the images is obtained by combining motion information on the object with motion information of the image capturing device during image capturing. Accordingly, the motion information on the image capturing device may be acquired separately by using an acceleration sensor, or the like, and motion information on the object obtained by subtracting the motion information on the image capturing device may be outputted. The motion information on the image capturing device may be also acquired and outputted by capturing the image of a stationary object. The outputted result is temporarily stored in the memory 16 and then subjected to the desired processing, for example, displayed on the display unit 19 and stored (saved) in the storage unit 20.

The input unit 18 is an interface which is operated by the user and serves to input information to the image capturing device 1 or change settings. For example, a dial, a button, a switch, or a touch panel can be used.

The display unit 19 is a display means configured of a liquid crystal display or an organic EL display. The display unit 19 is used for confirming the composition during imaging, browsing the captured and stored images, and displaying various setting screens and message information.

The storage unit 20 is a nonvolatile storage medium storing the produced image data, or parameter data which are to be used by the image capturing device 1. It is preferred that a high-capacity storage medium that can be read at a high speed be used as the storage unit 20. For example, a flash memory can be advantageously used.

<Method for Simultaneously Acquiring Time-Correlation Images Relating to a Plurality of Reference Signals>

Figure 2:
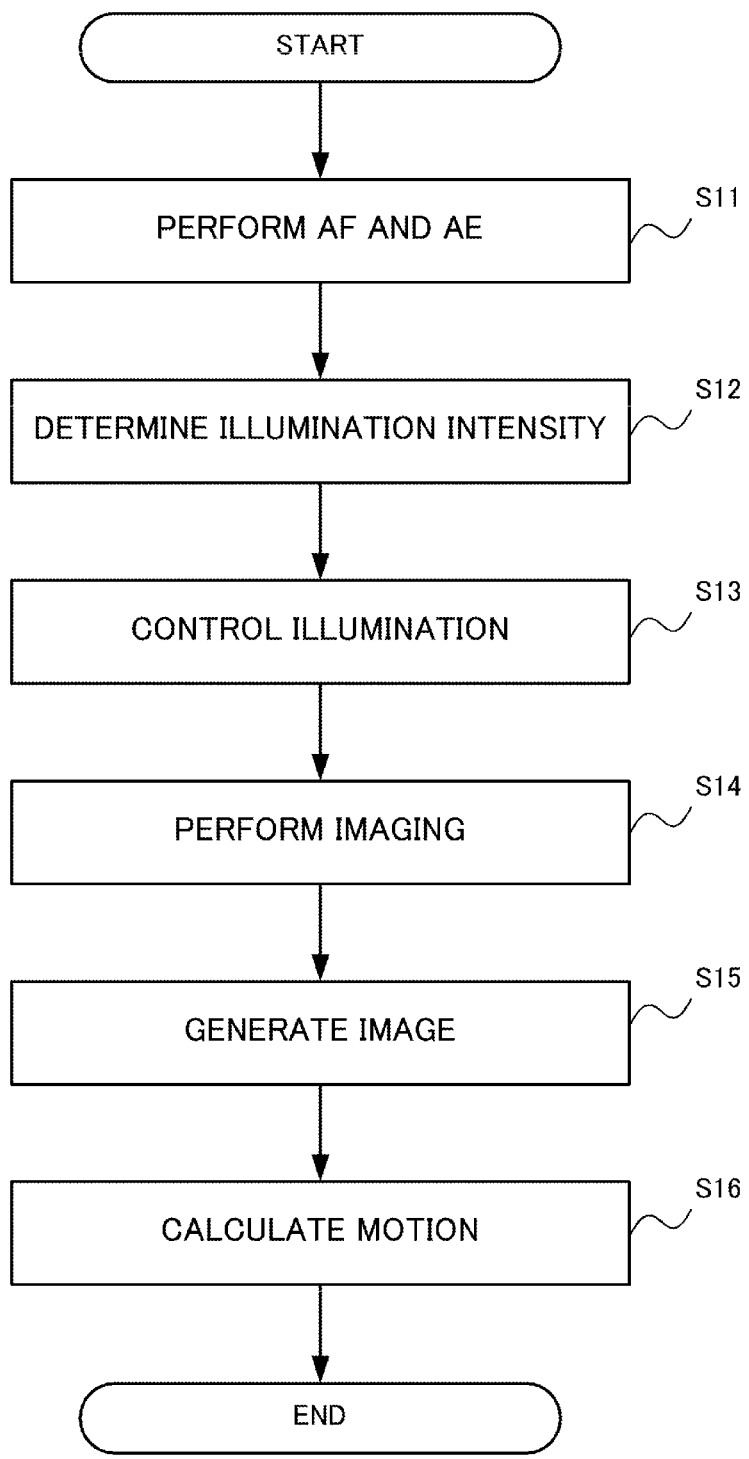
FIG. 2 is a flowchart illustrating the flow of motion information acquisition.

The sequence of operations from the time-correlation image imaging to motion information acquisition, which are performed by the image capturing device 1, is explained hereinbelow in greater detail with reference to FIG. 2 which is a flow chart illustrating the flow of processing from the imaging.

Where the user operates the input unit 18 to start the imaging, the imaging control unit 14 performs auto-focusing (AF) or automatic exposure control (AE) and determines the focus position and aperture (F number) (step S11). Then, the illumination control unit 11 determines the maximum intensity of the light of the lighting device 10 with respect to the focus position on the basis of the imaging conditions obtained with the imaging control unit 14 (step S12). It is preferred that the maximum intensity of the light of the lighting device 10 be greater for farther focus positions (distance to the object), but the maximum intensity may be also a value which has been set in advance regardless of the focus position.

The conditions for the illumination light source in the lighting device 10 are explained hereinbelow. The time-correlation image acquired by changing the intensity of illumination according to the reference signal is determined by the intensity (L) of the illumination light, spectral distribution (EL) of the environmental light, spectral reflectance (R) of the object, transmittance (T) of color filters on the image capturing element, and sensitivity (S) of the image capturing element. The spectral reflectance of the object during imaging and the spectral distribution of the environmental light are generally unknown. Therefore, where the illumination is performed using light sources of different wavelengths, the intensity of the obtained image is not constant even when the maximum intensity of the illumination light is the same. In other words, even when the illumination is performed with intensity modulation in which the maximum intensities of a plurality of light sources are matched, it is impossible to acquire the time-correlation images for reference signals with the same maximum value of intensity.

Figure 3A:
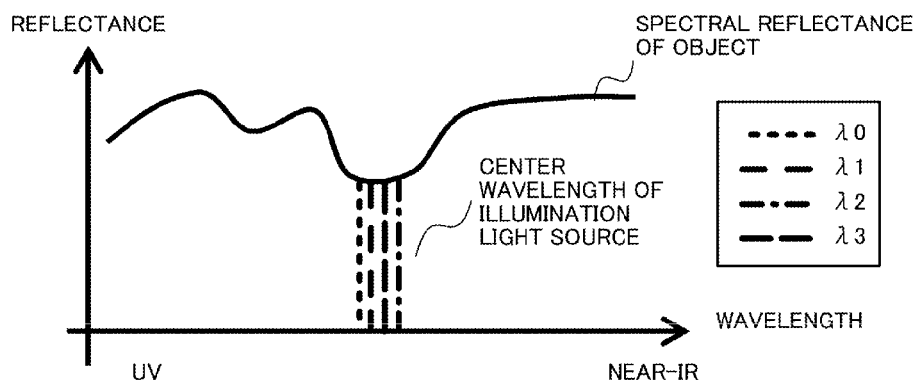
FIGS. 3A to 3C illustrate the spectral distribution of illumination light in Embodiment 1.

To address this problem, in the present embodiment, the imaging is performed using spectra with narrow wavelength ranges. The spectral reflectance of an object can be generally found to change continuously in the case of a continuous wavelength, and abrupt changes are rare. In FIG. 3A, an example of spectral reflectance of an object is represented from ultraviolet radiation to near-infrared radiation. In FIG. 3A, the attention is focused on specific narrow wavelength region ($\lambda 0$ to $\lambda 3$), and in this wavelength region, the spectral reflectance of the object can be assumed to be substantially constant. An image can be acquired by dividing this wavelength region further into narrower spectra with center wavelengths $\lambda 0$, $\lambda 1$, $\lambda 2$, $\lambda 3$. In this case, images of different wavelengths can be acquired separately, while making it possible to substantially ignore the effect of intensity variations caused by the spectral reflectance. Likewise, where the spectral distribution of the environmental light is also in a narrow wavelength region, the same intensity can be assumed and the effect of the environmental light also can be considered to be constant.

Figure 3B:
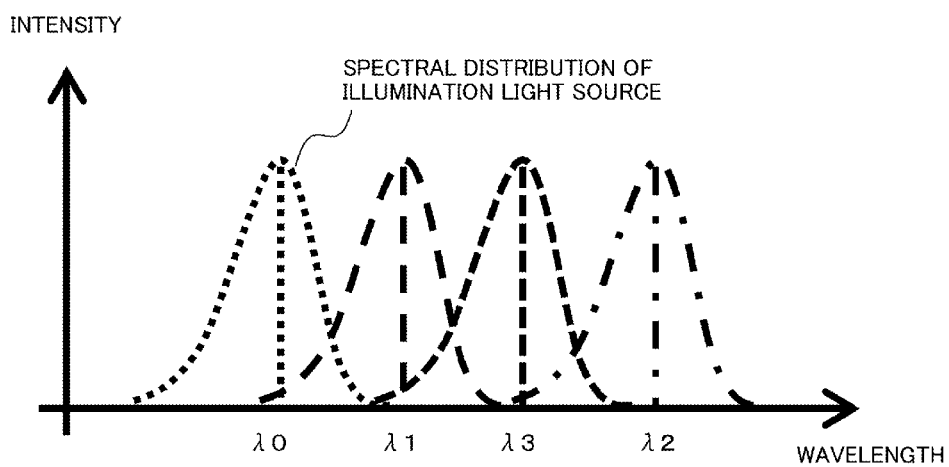

The center wavelength and spectral distribution of the illumination light source and the center wavelength and spectral distribution of color filters are set in narrow bands so that the aforementioned conditions could be satisfied. A plurality of dot lines in FIG. 3A indicate center wavelengths ($\lambda 0$ to $\lambda 3$) that are used by the image capturing device 1 for imaging. More specifically, the center wavelengths $\lambda 0$ to $\lambda 2$ are the center wavelengths of light rays emitted by a plurality of illumination light sources of the lighting device 10, and the center wavelengths $\lambda 0$ to $\lambda 3$ are the center wavelengths of light acquired by the image capturing element 13. Further, FIG. 3B illustrates an example of spectral distribution of the illumination light sources in the $\lambda 0$ to $\lambda 2$ wavelength regions and a spectral distribution of the color filters of the image capturing element in the $\lambda 3$ wavelength region. Since $\lambda 3$ is a spectrum for measuring the environmental light, the illumination light is not emitted from the lighting device 10 in this spectrum. Further, since the spectral distributions of the color filters in the $\lambda 0$ to $\lambda 2$ wavelength regions are substantially identical to the spectral distributions of the illumination light sources, they are omitted in FIG. 3B.

Figure 3C:
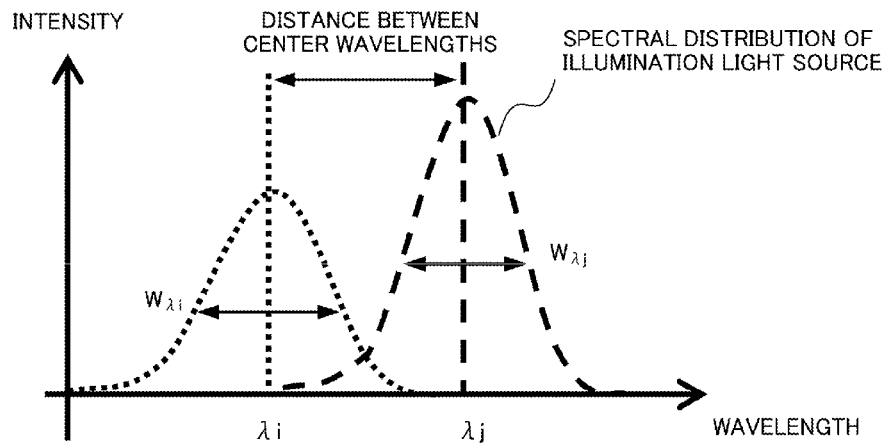

As the distance between the center wavelengths of those four spectra decreases, fluctuations of the spectral reflectance of the object and the spectral distribution of the environmental light are reduced and highly accurate time-correlation images can be acquired. Further, as the spectral width is reduced and mutual overlapping regions of the spectra are decreased in size, the effect of other spectra can be reduced. As for the relationship between the distance between the center wavelengths of the adjacent spectra and the spectral width, as depicted in FIG. 3C, it is preferred that the distance between the center wavelengths be made larger than the distance obtained by adding up the half width at half maximum of one spectrum and the half width at half maximum of the other spectrum.

When a laser is used as the light source, the spectral width can be several nanometers and the wavelengths of a plurality of illumination light sources can be set in a range of ten odd nanometers. Meanwhile, where a LED is used as the illumination light source, the spectral width is difficult to reduce to several nanometers. Therefore it is preferred that the distance between the center wavelengths be within 50 nm, and the half width at half maximum of the spectrum also be within 50 nm. Where the half width at half maximum of the spectrum of one illumination light source is denoted by $W\lambda i$ and the half width at half maximum of the spectrum of the other illumination light source is denoted by $W\lambda j$, the distance CW between the adjacent center wavelengths can be represented by the following expression.

[Math. 9]

$$CW > \frac{w_{\lambda 0}}{2} + \frac{w_{\lambda 1}}{2}, \quad CW \leq 50 \text{ nm} \tag{9}$$

The lighting device 10 radiates only three spectra with the center wavelengths $\lambda 0$ to $\lambda 2$, but when the center wavelength or spectral width is determined, assuming that the $\lambda 3$ spectrum is also radiated, it is preferred that the emission of the $\lambda 3$ spectrum be also assumed and abovementioned condition be fulfilled among those four spectra.

In step S13, the illumination control unit 11 determines the reference signal period and reference signal frequency during the exposure according to the imaging conditions obtained in step S11 and performs illumination with intensity modulation that differs for each wavelength of the illumination light sources of the lighting device 10 by using the determined reference signal.

Figure 4A:
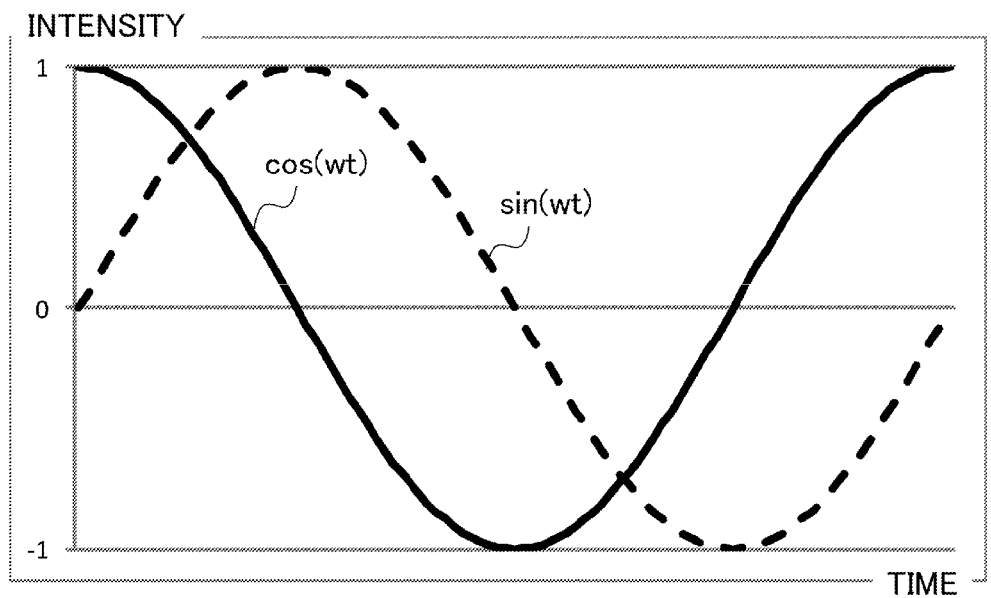
FIGS. 4A and 4B illustrate the reference signal and illumination light intensity.

The reference signal used in the illumination control unit 11 serves to establish correlation with the shading of the object, and any signal that changes with time can be inputted. Two sine wave signals (a cos wave signal and a sin wave signal) which are offset in phase by 90°, such as depicted in FIG. 4A, represent an example of the reference signals. Periodic signals such as rectangular wave of saw wave signals can be also used. Different reference signals which are used at the same time differ in at least one of the phase, frequency, and period of the signals, and it is preferred that waveforms of the same type be used.

Figure 4B:
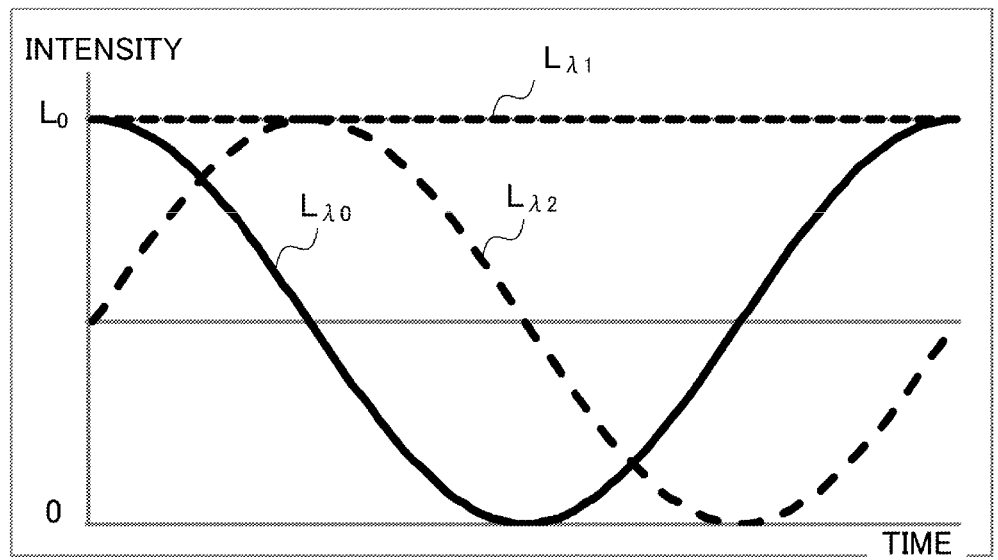

In the present embodiment, the illumination control unit 11 radiates intensity-modulated light obtained by intensity modulation of the $\lambda 0$ and $\lambda 2$ illumination light sources with a cos wave and a sin wave. In the illumination control unit 11, the $\lambda 1$ illumination light source radiates constant illumination light having an output of a constant value, without intensity modulation. FIG. 4B shows the intensities $L_{\lambda 0}$, $L_{\lambda 2}$ of the two intensity-modulated light rays and the intensity $L_{\lambda 1}$ of the constant illumination light. Those light intensities can be specifically represented in the following manner.

[Math. 10]

$$\begin{cases} L_{\lambda 0} = \frac{L_0}{2}(1 + \cos(\omega t)) \\ L_{\lambda 1} = L_0 \\ L_{\lambda 2} = \frac{L_0}{2}(1 + \sin(\omega t)) \end{cases} \quad (10)$$

Here, $L_0$ is a constant numerical value, and $\omega$ is an angular frequency of the reference signal. A method for determining the angular frequency $\omega$ of the reference signal is described hereinbelow. Since the angular frequency and frequency differ from each other only by a constant factor, the angular frequency will be simply referred to hereinbelow as frequency.

When the intensities of a plurality of illumination light sources are the same, it is desirable that the maximum amplitude of the sine wave and the constant output have the same value, but the below-described acquired image can be also corrected by using the difference in outputs. Further, in the above-described example, the minimum amplitudes of $\lambda 0$ and $\lambda 2$ are zero, but the minimum amplitudes may be larger than zero.

It is also desirable that the difference in phase between two sine reference signals be 90°, but the phase shift within ±30° is also allowed. Thus, the difference between the phases of the two reference signals may be within 90°±30° (60° (inclusive) to 120° (inclusive)). However, as the phase difference shifts from 90°, the accuracy of motion information acquisition decreases. Therefore, it is preferred that the difference in phase between the two sine waves be ±10° (80° (inclusive) to 100° (inclusive)). The frequencies $\omega$ of the two sine waves are optimally the same, but may be different. When the frequencies are different, it is desirable that a change between the difference in phase between the two sine waves at the start of exposure and the difference in phase between the two sine waves at the end of exposure be suppressed to within ±30° (−30° (inclusive) to 30° (inclusive)). Since the accuracy of motion information acquisition decreases with the increase in the change in phase difference during the exposure, it is more preferred that a change between the phase difference between the two sine waves at the start of exposure and the phase difference between the two sine waves at the end of exposure be ±10° or less (−10° (inclusive) to 10° (inclusive)). Thus, where the two frequencies are denoted by $\omega_1$, $\omega_2$ and the exposure period is denoted by T, it is preferred that the condition of $|\omega_1-\omega_2|\times T \leq 10°$ (or 30°) be fulfilled. Incidentally, it is preferred that the difference in phase between the two sine waves be within 90°±30° (60° (inclusive) to 120° (inclusive)), more preferably within 90°±10° (80° (inclusive) to 100° (inclusive)) within the exposure period. It is most preferred that the difference in phase between the two sine waves within the exposure period be 90° at all times.

The illumination control unit 11 can be configured to input the reference signals from the outside with a reference signal input unit (not depicted in the figure). It is also possible to store the reference signal values, which have been determined in advance, in a memory or storage unit 20 in the illumination control unit 11, so that the illumination control unit 11 could read and use those values. The illumination control unit 11 may also hold a function and coefficients thereof to generate and use the signal values.

A method for determining the reference signal frequency $\omega$ is described hereinbelow. The illumination control unit 11 adjusts the reference signal frequency such that the period of the reference signal included in the exposure time period determined by exposure control in step S11 be an integer value. Thus, the illumination control unit 11 sets the reference signal frequency $\omega$ in the following manner.

[Math. 11]

$$\omega = \frac{2n\pi}{T} \quad (11)$$

Here, T is the exposure time period. Further, n is an integer and corresponds to the frequency of the sine wave during the exposure.

The illumination control unit 11 may use a value, which has been stored in advance in the storage unit 20, as the n value, or may use the value selected by the user. Further, the illumination control unit 11 may determine the integer n such that $\omega$ is confined within a range that has been stored in advance or acquired from the user.

Meanwhile, the imaging control unit 14 can also change the shutter speed (exposure time period T) and aperture value and perform imaging such as to ensure the correct exposure so that the frequency $\omega$ of the reference signal during the exposure and the period n of the reference signal included in the exposure fulfil predetermined conditions.

When the motion of an object performing rapid motion is acquired, it is advantageous to increase the modulation frequency $\omega$ over that in the case in which the motion of an object performing slow motion is acquired. For example, the speed of the object acquired by the user from the input unit can be inputted from the input unit 18, and the illumination control unit 11 can determine the integer n according to the inputted object speed. Since the relationship between the object speed and the appropriate modulation frequency can be understood in advance, the illumination control unit 11 may determine the integer n to be close to the appropriate modulation frequency corresponding to the object speed.

In step S14, the imaging control unit 14 performs the imaging process. More specifically, in this process, the illumination control unit 11 starts emission of two intensity-modulated illumination light rays and the constant illumination light on the basis of a signal from the imaging control unit 14, and at the same time the shutter (not depicted in the figure) is opened and exposure is performed. The light emitted by the lighting device 10 is reflected by the object and an image is formed on the image capturing element 13 through the image capturing optical system 12. The shutter (not depicted in the figure) is configured of a mechanical shutter or an electronic shutter.

The imaging control unit 14 controls the illumination control unit 11 and the image capturing element 13 such that the modulation of illumination is started at the exposure start timing and the exposure is ended to include the illumination modulation with an integer period. Alternatively, the modulated illumination can be implemented in advance by the illumination control unit 11, and imaging can be performed by controlling the exposure time such that the modulation with the integer period is included in the exposure time. When imaging of a dynamic image is performed, the frequency of the reference signal is determined by the illumination control unit 11 such that the modulation with an integer period is performed in a determined single frame time, and the modulated illumination is implemented continuously and synchronously with the exposure.

Figure 5A:
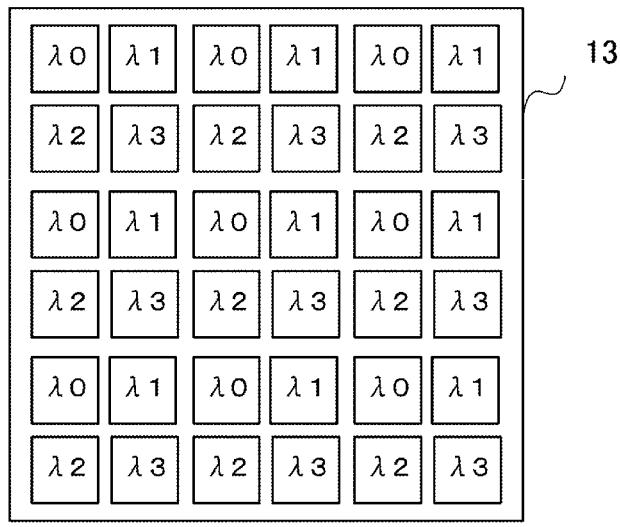
FIGS. 5A to 5C illustrate the image capturing element in Embodiment 1.

The configuration of the image capturing element 13 is described hereinbelow. As depicted in FIG. 5A, the image capturing element 13 has at least four color filters having predetermined spectral distributions corresponding to the wavelength bands $\lambda 0$ to $\lambda 2$ of the plurality of illumination light sources constituting the lighting device 10 and the wavelength band $\lambda 3$ for environmental light measurement. In the image capturing element 13, as depicted in FIG. 5A, four pixels having four color filters are arranged in 2 rows and 2 columns, and pixel groups each constituted by the four pixels are arranged two dimensionally. The center wavelength and spectral distribution of each color filter need to be substantially the same as the spectral distribution of the illumination light, for example, such as depicted in FIG. 3B. Such image capturing element 13 makes it possible to acquire an image corresponding to two intensity-modulated light rays and the constant illumination light and an image (environmental light image) for environmental light measurement. The separation of wavelengths in the image capturing element 13 can be performed not only with color filters, but also by using diffraction. Further, a configuration in which color filters transmitting a plurality of different wavelengths are disposed on one image capturing element and a configuration in which a plurality of image capturing elements is used and color filters transmitting a different wavelength for each image capturing element are arranged may be also used.

Figure 5B:
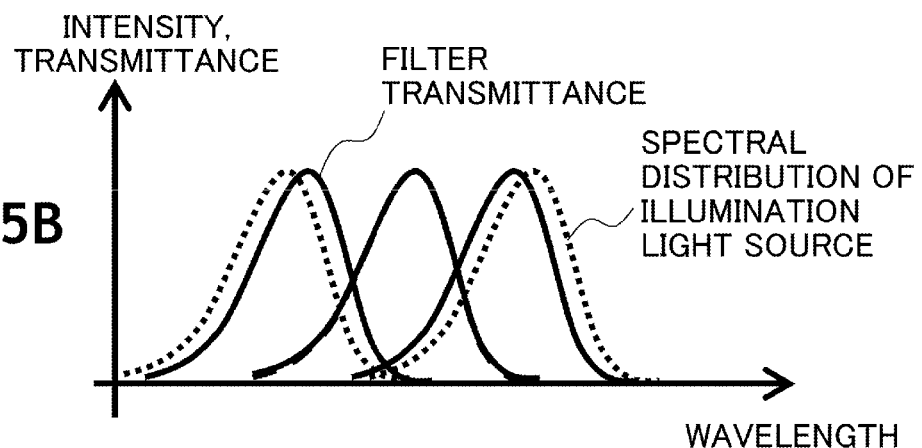
Figure 5C:
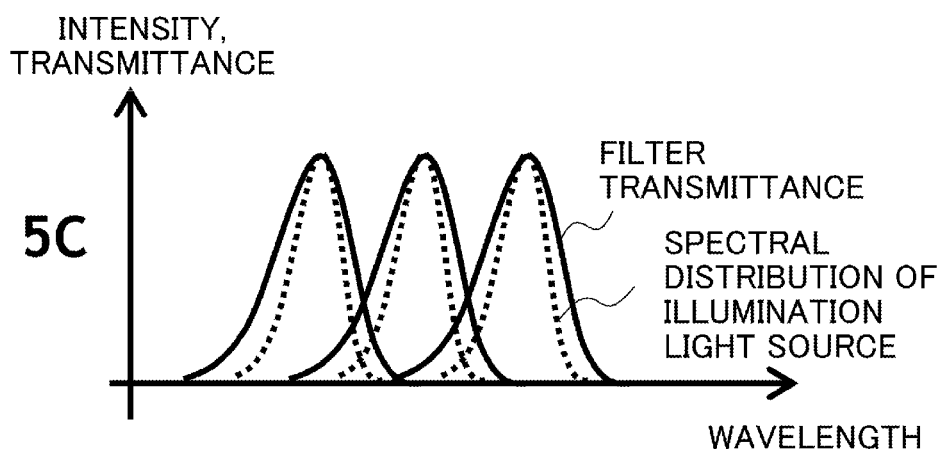

The spectra of the illumination light sources and the spectra of the color filters of the image capturing element do not always need to be the same. A configuration can be also used in which wavelength characteristics of the illumination light sources and color filters are shifted in order to reduce further the overlapping of wavelengths. For example, the design by which the region where the spectra overlap is further reduced by shifting the center wavelengths of the illumination light sources and color filers, as depicted in FIG. 5B, is also effective. Furthermore, the overlapping regions can be also reduced by configuring any one of the spectra of the illumination light sources and color filters to have a more narrow-band spectral characteristic, as depicted in FIG. 5C and matching the center wavelengths.

Where the shutter is closed, the imaging control unit 14 reads an image from the image capturing element 13 and transfers the image to the image processing unit 15. The image processing unit 15 receives the input of signal values of the image acquired by the image capturing element 13 and performs image generation for each wavelength of color filters (step S15). The image processing unit 15 also performs correction based on the difference in intensity for each wavelength of the illumination light sources, the difference in transmittance between the color filters on the image capturing element, and the difference in sensitivity for each wavelength in the image capturing element in the course of the image generation processing. The image processing unit 15 also corrects the effect of the environmental light reflected from the object by using the pixel values obtained from the pixels of the wavelength band ($\lambda 3$) where no illumination is performed. The correction processing can be also performed for each pixel before the image for each wavelength is generated. The corrected image is temporarily stored in the memory 16, displayed, as necessary, at the display unit 19, and stored in the storage unit 20.

The above-described correction processing is explained hereinbelow in greater detail. In the correction processing, the environmental light (EL), reflectance (R) of the object, illumination light source intensity (L), color filter transmittance (T), and image capturing element sensitivity (S) need to be taken into account and fluctuations in signal intensity caused thereby need to be eliminated. At the wavelength $\lambda 0$, the environmental light which does not change with time is denoted by $EL(\lambda 0)$, the spectral reflectance of the moving object is denoted by $R(\lambda 0, t)$, the intensity of the illumination light is denoted by $L(\lambda 0, t)$, the transmittance of color filters is denoted by $T(\lambda 0)$, and the sensitivity of the image capturing element is denoted by $S(\lambda 0)$. The intensity $L(\lambda 0, t)$ of the intensity-modulated light at the wavelength $\lambda 0$ is $0.5 \times L_0 \times (1+\cos(\omega t))$, as indicated in Expression 10. The brightness value $I_{\lambda 0}(i, j, X\lambda)$ of the image in the pixel $(i, j)$ is represented by the following expression.

[Math. 12]

$$I_{80_0}(i,j,\lambda_0) = \int_0^T \{EL(\lambda_0)+L(\lambda_0,t)\}R(\lambda_0,t)T(\lambda_0)S(\lambda_0)dt \quad (12)$$

In addition to the brightness value determined by the reflection of the intensity-modulated light, the brightness value $I_{\lambda 0}(i, j, \lambda 0)$ also includes a brightness value determined by the reflection of the environmental light. The reflected illumination light is not included in the image (environmental light image) with the wavelength $\lambda 3$ at which no illumination is performed. Therefore, the brightness value determined by the environmental light can be removed on the basis of the environmental light image. The brightness value $I_{\lambda 3}(i, j, \lambda 3)$ of the environmental light image with the wavelength $\lambda 3$ is represented by the following expression.

[Math. 13]

$$I_{\lambda_3}(i,j,\lambda_3) = \int_0^T EL(\lambda_3)R(\lambda_3,t)T(\lambda_3)S(\lambda_3)dt \quad (13)$$

Further, the brightness value $I_{\lambda 1}(i, j, \lambda 1)$ of the image at the wavelength $\lambda 1$ at which the constant illumination light is emitted is represented by the following expression. In this case, the illumination intensity $L(\lambda 1, t) = L(\lambda 1) = L_0$, as indicated by Expression 10.

[Math. 14]

$$I_{80_1}(i,j,\lambda_1) = \int_0^T \{EL(\lambda_1)+L(\lambda_1)\}R(\lambda_1,t)T(\lambda_1)S(\lambda_1)dt \quad (14)$$

Likewise, the brightness value $I_{\lambda 2}(i, j, \lambda 2)$ of the image at the wavelength $\lambda 2$ is represented by the following expression. The intensity $L(\lambda 2, t)$ of the illumination light source at the wavelength $\lambda 2$ is $0.5 \times L_0 \times (1+\sin(\omega t))$, as indicated in Expression 10.

[Math. 15]

$$I_{80_2}(i,j,\lambda_2) = \int_0^T \{EL(\lambda_2) + L(\lambda_2, t)\} R(\lambda_2, t) T(\lambda_2) S(\lambda_2) dt \quad (15)$$

The image processing unit 15 corrects the effect of environmental light and the effect of wavelength by using those four images $I_{\lambda 0}$ to $I_{\lambda 3}$. Initially, the difference in the transmittance T of the color filters which is caused by the difference in wavelength, and the difference in the sensitivity S of the image capturing element are corrected. The difference in the transmittance T of the color filters and the difference in the sensitivity S of the image capturing element caused by the wavelength can be determined in advance by measurements. Values thereof are thus measured, the correction coefficients for matching with the values at the reference wavelength are stored, and the image processing unit 15 performs normalization by using the correction coefficients. For example, the light source wavelength $\lambda 1$ at which constant-value illumination is performed is taken as a reference and the correction is performed such that the product of the transmittance $T(\lambda 0)$, illumination light intensity $L(\lambda 0)$, and image capturing element sensitivity $S(\lambda 0)$ at $\lambda 0$ matches the product $T(\lambda 1)L(\lambda 1)S(\lambda 1)$ at the wavelength $\lambda 1$. When the wavelengths are close to each other and the transmittance T of the color filters and the sensitivity S of the image capturing element can be considered constant, or when the calculation accuracy of motion information can be lowered, such correction processing may be omitted.

Then the environmental light intensity EL at each wavelength during measurements and the reflectance R of the object at each wavelength, which are unknown, are corrected. In this case, when the wavelengths $\lambda 0$ and $\lambda 3$ are in a narrow wavelength band, the reflectance R of the object at each wavelength and the environmental light intensity EL at each wavelength, which are unknown, can be assumed to be constant. Under this assumption, the image $I_{\lambda 3}$ captured without performing the illumination represents the illumination EL with the environmental light and the reflectance R of the object. Therefore, it is possible to obtain images $I_{\lambda 0}'$, $I_{\lambda 1}'$, $I_{\lambda 2}'$ from which the effect of the environmental light has been removed by subtracting the environmental light image $I_{\lambda 3}$ at the wavelength at which no illumination is performed from the images $I_{\lambda 0}$, $I_{\lambda 1}$, $I_{\lambda 2}$ at the wavelength at which the illumination has been performed.

The corrected image $I_{\lambda 1}'$ represents the image obtained by constant illumination from which the environmental light has been removed, the corrected image $I_{\lambda 0}'$ represents the time-correlation image with the cos wave, and the corrected image $I_{\lambda 2}'$ represents the time-correlation image with the sin wave. Actually, the intensity of illumination at the wavelengths $\lambda 0$ and $\lambda 2$ can be determined as indicated by Expression 10. Therefore, the following calculations need to be performed to acquire the time-correlation image of cos ($\omega t$) and sin($\omega t$).

[Math. 16]

$$\begin{cases} I_{\lambda 1}'' = I_{\lambda 1}'/2 \\ I_{\lambda 0}'' = I_{\lambda 0}' - I_{\lambda 1}'' \\ I_{\lambda 2}'' = I_{\lambda 2}' - I_{\lambda 1}'' \end{cases} \quad (16)$$

In the example explained hereinabove, the maximum value of the illumination light is constant and equal to $L_0$ at all of the wavelengths, but where the illumination intensity differs for each wavelength, normalization needs to be performed at this stage.

The usual intensity image $I0(x, y)$ in Expression 8 corresponds to the abovementioned $I_{\lambda 1}''$. The time-correlation image $I(x, y)$ in Expression 8 corresponds to $I_{\lambda 0}'' - iI_{\lambda 2}''$.

In the preferred allocation of reference signals to the wavelength bands, the wavelength band of the illumination determined by the constant-value reference signal is taken as a center and the wavelength bands in which the modulated illumination is performed are arranged on the shorter wavelength side and longer wavelength side thereof. In the above-described example, it is preferred that $\lambda 0 < \lambda 1 < \lambda 2$. Another advantageous approach is to take the wavelength band in which no illumination is performed and the wavelength band of constant-value illumination as the centers and arrange the wavelength bands in which the modulated illumination is performed on the shorter wavelength side and longer wavelength side thereof. In the above-described example, it is preferred that $\lambda 0 < \lambda 1 < \lambda 2$ and $\lambda 0 < \lambda 3 < \lambda 2$.

Motion information is then acquired in the motion computation unit 17 by computing Expression 8 by using the intensity image I1 and time-correlation images I0, I2 stored in the memory 16 (step S16). When the computation of Expression 8 is performed, only the values of a single pixel may be used, but taking stability into account, it is preferred that a predetermined least-square solution be computed using the values of pixels in a region close to the pixel of interest. The acquired motion information is subjected to the desired processing, for example, saved in the storage unit 20, or used with another application.

As described hereinabove, variations in the intensity of captured image caused by spectral reflectance of the object and spectral distribution of environmental light can be reduced by establishing correspondence between the spectra of a plurality of illumination light sources and the spectrum of the image acquired by the image capturing element and bringing the center wavelengths close to each other by narrowing the spectral width. As a result, time-correlation images in which the maximum amplitudes of reference signals match can be acquired at the same time with a single imaging operation, without measuring the spectral distribution of the environmental light or spectral reflectance of the object. Further, by using the acquired time-correlation images, it is possible to perform high-accuracy and high-resolution motion vector acquisition computations which do not require the approximation by the difference between two frames.

The effect demonstrated by the configuration of the present embodiment is that images which are time-correlated with a plurality of reference signals can be acquired at the same time merely by changing the color filters and modifying the illumination, without significant circuitry modification of the conventional image capturing element, and the cost of the image capturing device can be reduced.

Another effect is that the time-correlation images can be acquired without reducing the sampling number of the reference signals with respect to that when images which are time-correlated with a plurality of reference signals are acquired at the same time with a shutter or light intensity modulator by using a single image capturing element.

Second Embodiment

The second embodiment of the present invention is described hereinbelow. The second embodiment differs from the first embodiment in that the center wavelengths of the illumination light sources are set apart. In this case, the assumption that the environmental light intensity and spectral reflectance of the object are the same at any wavelength becomes invalid. Accordingly, in the present embodiment, the configuration of the first embodiment is changed such that a time-correlation image for which the maximum amplitudes of the reference signals match can still be acquired when the center wavelengths of the illumination light sources are set apart. Since the configuration of the image capturing device 1 is basically the same as that in the first embodiment, like components in the explanation below are assigned with like reference numerals. Explained hereinbelow are mainly the differences with the first embodiment.

The lighting device 10 in the present embodiment is similar to that in the first embodiment in that it radiates spectra with center wavelengths $\lambda 0$ to $\lambda 2$, but different in that the distance between the center wavelengths is larger than in the first embodiment and is equal to or greater than 50 nm. The illumination light is the same as in the first embodiment, except for the different distance between the center wavelengths.

Where the center wavelengths of the illumination light are thus set far apart, the spectral distribution (EL) of the environmental light and the spectral reflectance (R) of the object in each band can be also significantly different. As a result, the intensity of the time-correlation image greatly differs depending on the wavelength band even when the difference in the intensity (L) caused by the wavelength of the illumination light sources, the difference in the transmittance (T) of color filters, and the difference in the sensitivity (S) caused by the wavelength at the image capturing element are corrected in the image processing unit 15. Therefore, the effect of the spectral distribution (EL) of the environmental light and the effect of the spectral reflectance (R) of the object need to be corrected.

Figure 6A:
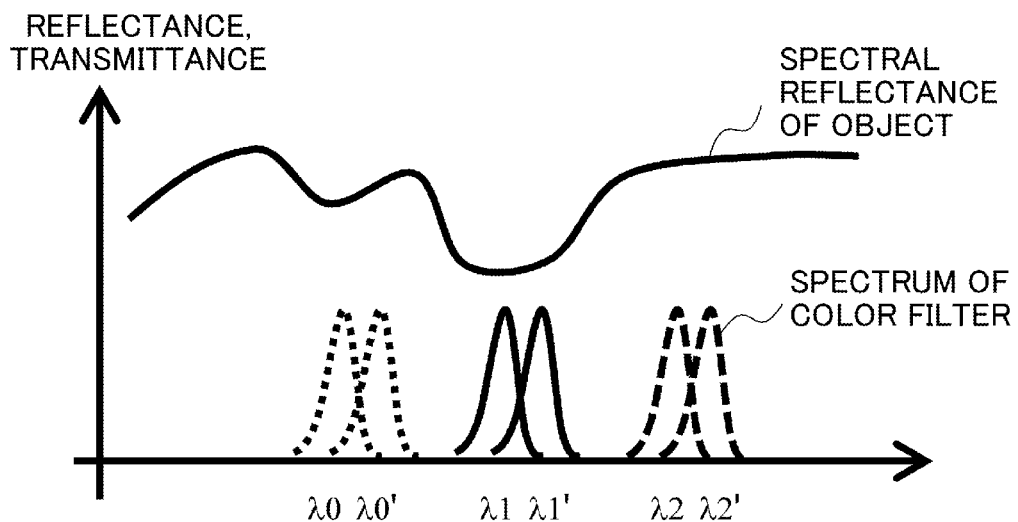
FIGS. 6A to 6C illustrate the spectral distribution of illumination light and the image capturing element in Embodiment 2.

For this reason, the types of color filters disposed in the image capturing element 13 are changed. In the present embodiment, an image corresponding to each illumination light of the lighting device 10 is acquired and an image (environmental light image) that includes no effect of the illumination light at the wavelength close to that of each illumination light is also acquired. Therefore, color filters having spectra with the center wavelengths $\lambda 0$ to $\lambda 2$ which are substantially the same as those of the light sources of the lighting device 10 and color filters having similar spectra with the center wavelengths $\lambda 0'$ to $\lambda 2'$ which are close to the center wavelengths of the light source devices are arranged in pairs in the image capturing element 13. An example of the spectra of specific color filters is shown in FIG. 6A. The image capturing element 13 has pixels provided with color filters having spectra of six types with center wavelengths $\lambda 0$ to $\lambda 2$ and $\lambda 0'$ to $\lambda 2'$ depicted in FIG. 6A. The spectra of color filters with the center wavelengths $\lambda 0$, $\lambda 1$, $\lambda 2$ are substantially the same as the spectra of the light source devices of the lighting device 10. The spectra with the center frequencies $\lambda 0'$, $\lambda 1'$, $\lambda 2'$ are set between the spectra with the center wavelengths $\lambda 0$, $\lambda 1$, $\lambda 2$ to fulfill the condition of Expression 9. The spectral reflectance of the object in the spectra of different illumination light sources can differ significantly, but between the spectra of the color filters forming a pair, the spectral reflectance of the object can be considered to be substantially the same.

Figure 6B:
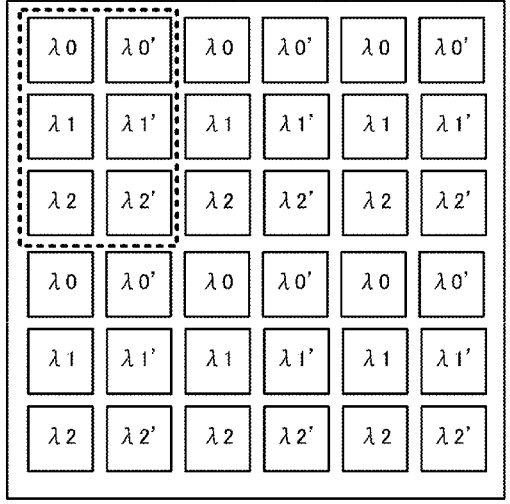
Figure 6C:
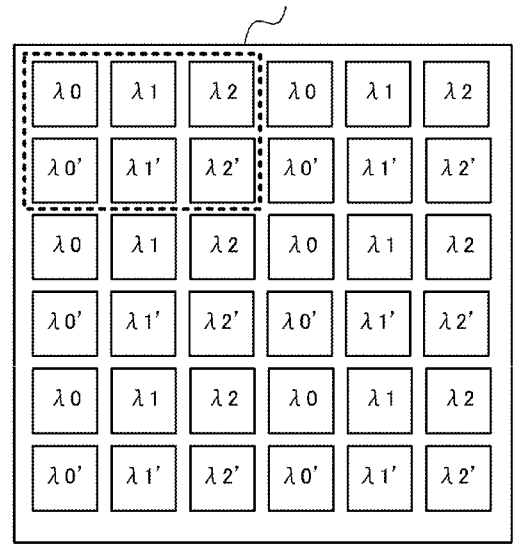

FIGS. 6B and 6C show an example of the arrangement of color filters on the image capturing element 13. In the example depicted in FIG. 6B, the color filters forming a pair with close center wavelengths are arranged adjacently in the horizontal direction, and the pairs of color filters with different center frequencies are arranged periodically in the vertical direction. In the example depicted in FIG. 6C, the color filters forming a pair are arranged adjacently in the vertical direction, and the pairs of color filters with different center frequencies are arranged periodically in the horizontal direction. It is preferred that the color filters forming each pair be arranged adjacently, as depicted in FIGS. 6B and 6C, but such an arrangement order of color filters is not limiting.

A method for generating the time-correlation image which is implemented by the image processing unit 15 is described hereinbelow. In this case, the image processing unit 15 corrects the difference between various parameters caused by the wavelength in a manner similar to that of the first embodiment, but the specific processing contents are different from those of the first embodiment.

Initially, the image processing unit 15 corrects the difference in the transmittance T of the color filters on the image capturing element which is caused by the difference in wavelength, and also corrects the difference in the sensitivity S for each wavelength in the image capturing element in the images at wavelengths forming pairs. In this case, when the wavelengths forming pairs are sufficiently small, it is possible to assume that there is no difference between the parameters thereof and omit the processing. Then, the image processing unit 15 subtracts the images with the center wavelengths $\lambda 0'$ to $\lambda 2'$ at which no illumination is performed from the time-correlation images with the center wavelengths $\lambda 0$ to $\lambda 2$ at which the illumination has been performed between the color filters forming pairs. As a result, the effect produced by the spectral distribution EL of the environmental light can be removed and three images including only the effect produced by the illumination light L are obtained. Since the wavelength bands of those illumination light images differ significantly from each other, the spectral reflectance R of the object, the intensity L of the illumination light sources, the transmittance T of the color filters, and the sensitivity S of the image capturing element differ significantly. Therefore, the image processing unit 15 then performs correction, such that the same brightness values are modulated by signals of the same intensity, by using the intensity L of the illumination light sources, the transmittance T of the color filters, and the sensitivity S of the image capturing element which have been measured in advance.

In this case, the effect of the spectral reflectance R of the object remains uncorrected. In order to correct it, images obtained with the environmental light with the center wavelengths $\lambda 0'$ to $\lambda 2'$ are used. Initially, the transmittance T of the color filters and the sensitivity S of the image capturing element are corrected in the environmental light image. As a result, the difference remaining in the environmental light image becomes the effect of the spectral distribution EL of the environmental light and the spectral reflectance R of the object. In this case, a white balance is calculated from the corrected image. The white balance represents the spectral distribution of the environmental light, and the spectral reflectance R of the object is calculated by correcting the image by using the white balance. The spectral reflectance of the object in the illumination light image can be corrected by using the spectral reflectance R determined from the environmental light image.

The above-described correction processing makes it possible to obtain an image obtained with the constant illumination, a time-correlation image with a cos wave, and a time-correlation image with a sin wave. Motion information is calculated from those images in the same manner as in the first embodiment.

In the present embodiment, it is preferred that the center wavelengths of the illumination light sources with three different spectra be disposed close to the center wavelengths of the RGB color filters when the usual color image is acquired. The center wavelength of the R color filter is generally within a range from 580 nm to 650 nm, the center wavelength of the G color filter is generally within a range from 500 nm to 580 nm, and the center wavelength of the B color filter is generally within a range from 430 nm to 500 nm. The three spectra of the illumination light sources are set separately for each of the bands of the RGB color filters. In the present embodiment, color filters having the center wavelength close to the center wavelength of the respective illumination light source are arranged in pairs on the image capturing element. Therefore, the image obtained with the three wavelengths at which no illumination is performed correspond to respective RGB color plane images, the spectra of color filters are narrow, and color reproducibility is low, but the RGB color images can be acquired at the same time. Concerning the color (wavelength) captured under constant illumination, the wavelength band can be expanded and the accuracy of color reproduction is increased by considering an image in which two images obtained with color filters with a pair of wavelengths are combined as a single color plane image.

In this case, an RGB color image has been considered as an example of color image, but the above-descried procedure can be also used in the case of color images obtained with other color filters such as complementary color filters.

As indicated hereinabove, by increasing the number of types of color filters in the image capturing element 13, it is possible to reduce the effect of the spectral reflectance of the object and the effect of the spectral distribution of the environmental light and acquire the time-correlation images even when the center wavelengths of the illumination light sources are set apart.

Further, RGB color images can be also acquired at the same time by arranging the center wavelengths of the illumination light sources and the center wavelengths of color filters, which form pairs on the image capturing element, separately for the red region, green region, and blue region. Furthermore, when the modulated illumination is not performed, the band width of the color filters can be enlarged by combining color filters of a pair with close spectra, and when the modulated illumination is performed, a color image with high color reproducibility can be acquired.

Third Embodiment

The third embodiment of the present invention is described hereinbelow. The third embodiment differs from the first embodiment in that the center wavelengths of the illumination light sources are set apart. The present embodiment differs from the second embodiment in that imaging is performed a plurality of times so that time-correlation images matching the maximum amplitude of the reference signals could be acquired even when the center wavelengths of the illumination light sources are set apart. Since the configuration of the image capturing device 1 in the present embodiment is basically the same as that in the first embodiment, like components in the explanation below are assigned with like reference numerals. Explained hereinbelow are mainly the differences with the first embodiment.

Figure 7A:
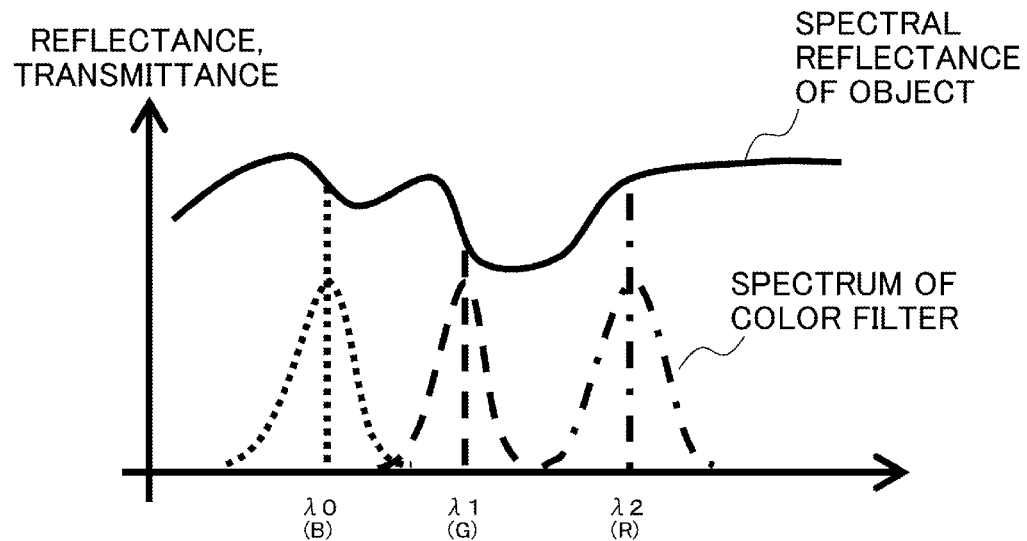
FIGS. 7A and 7B illustrate the spectral distribution of illumination light and the image capturing element in Embodiment 3.
Figure 7B:
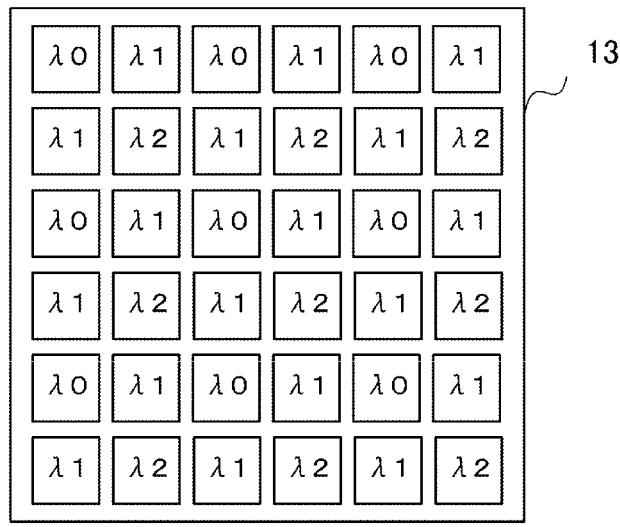

Initially described hereinbelow are the differences relating to the center wavelengths and spectra of the illumination light sources in the lighting device 10. The lighting device 10 emits light rays with three center wavelengths, and the feature of performing cos modulation, sin modulation, and no modulation of illumination light intensity is the same as in the first and second embodiments. The center wavelengths of the illumination light sources are set to wavelength bands separated by 50 nm or more from each other, in the same manner as in the second embodiment. It is more preferred that the three center wavelengths be arranged close to the center wavelengths of RGB. In the present embodiment, it is not necessary that the spectra be as narrow bands, as in the first and second embodiments. However, the arrangement is preferred such that the distance between the center wavelengths which are adjacent such that the Expression 9 is fulfilled be larger than a sum of half widths at half maximum of the respective spectra (FIG. 7A). Further, the image capturing element 13 can be configured to have color filters with spectra corresponding to those of the illumination light sources, and a Bayer arrangement, for example, such as depicted in FIG. 7B can be used. Where spectra are used such that cover the RGB region, while avoiding the overlapping, the image capturing element 13 of the present embodiment can acquire color images with color reproducibility higher than that in the second embodiment.

With the configuration of the present embodiment, normalized time-correlation images cannot be obtained by a single imaging operation due to the effect of the spectral reflectance of the object and the spectral distribution of the illumination light. Accordingly, the imaging is performed twice, namely, under the illumination modulated with the reference signal and without the illumination.

Figure 8:
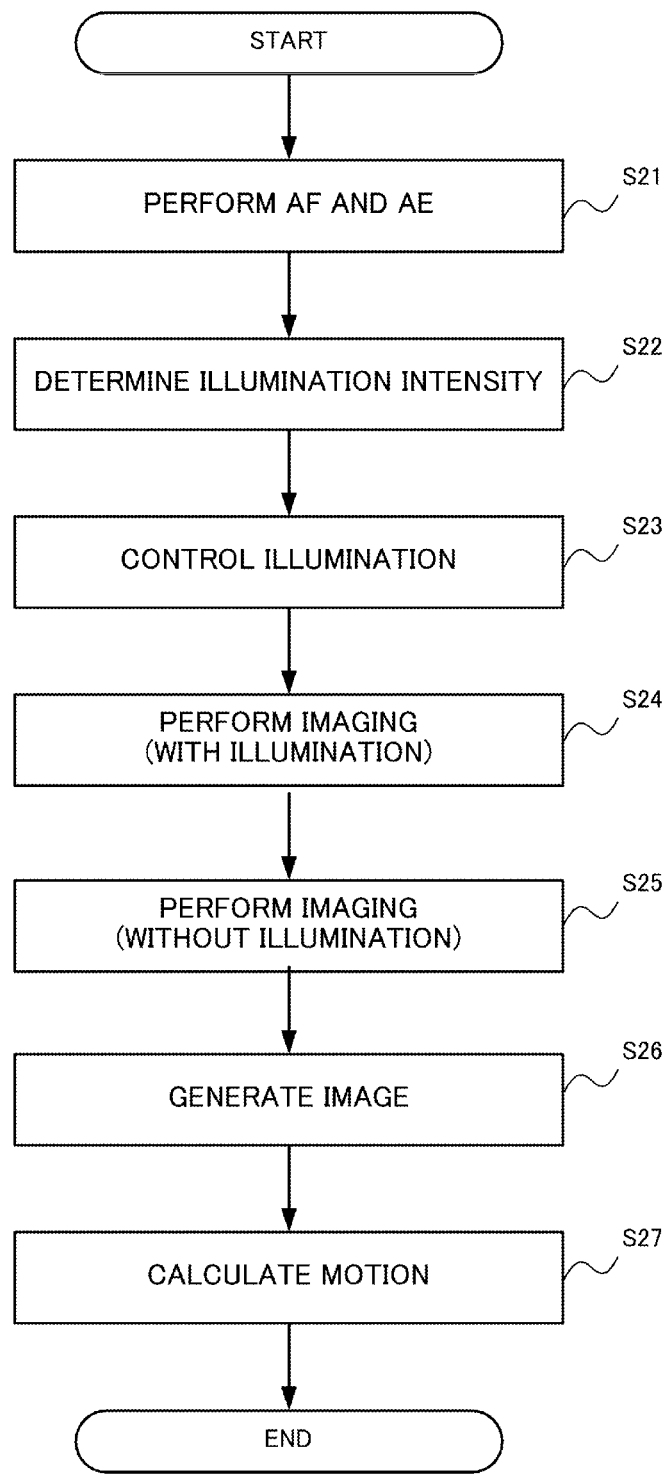
FIG. 8 is a flowchart illustrating the flow of motion information acquisition in Embodiment 3.

The flowchart of the imaging is presented in FIG. 8. The processing from step S21 to step S24 is the same as in the first embodiment. Then, in step S25, the imaging is performed without the illumination. The imaging without the illumination may be also performed before the imaging with the illumination, and the order of those imaging operations is not restricted. The image obtained by the imaging is read from the image capturing element 13 and temporarily stored in the memory 16.

The processing then advances to step S26, and the image processing unit 15 generates a time-correlation image. The image obtained by imaging without the illumination includes information on the spectral distribution of the environmental light and the spectral reflectance of the object. The effect of the environmental light and spectral reflectance can be removed by subtracting the image obtained by imaging without the illumination from the time-correlation image obtained by imaging with the illumination in the image of the same wavelength. The image obtained by imaging without the illumination may be saved as a color image in the storage unit 20.

The time-correlation image corrected in the image processing unit 15 is stored in the memory 16 and then read from the motion computation unit 17 and subjected to motion information acquisition processing (step S27). The generated motion information is stored in the storage unit 20.

With the configuration of the present embodiment, the restriction on the spectral width of the illumination light sources and the color filters on the image capturing element 13 can be alleviated. For example, by dividing into wide wavelength regions and setting the center wavelengths of the illumination light sources as depicted in FIG. 7A, it is possible to acquire a color image with color reproducibility higher than that in the second embodiment when the imaging is performed without modulated illumination. Therefore, time-correlation images and color image can be acquired with a single image capturing device.

Fourth Embodiment

The fourth embodiment of the present invention is described hereinbelow. The present embodiment is similar to the first embodiment in that the imaging is performed using illumination light rays with center wavelengths λ0 to λ2 located in a narrow wavelength ranges and four color filters with the center wavelengths λ0 to λ0. However, the present embodiment is different from the first embodiment in that all of the center wavelengths are set in the invisible range. Another difference from the first embodiment is that since the center wavelengths of the illumination light rays are set in the invisible range, RGB color filters for acquiring the usual image are arranged on the image capturing element. Since the configuration of the image capturing device 1 in the present embodiment is basically the same as that in the first embodiment, like components in the explanation below are assigned with like reference numerals. Explained hereinbelow are mainly the differences with the first embodiment.

In the present embodiment all of the center wavelength bands of the plurality of illumination light sources of the lighting device 10 are set in the invisible range. It is especially preferred that those wavelengths be near-infrared (IR) wavelengths from 750 nm to 1.4 μm. As for the spectra of those illumination light sources, it is preferred that the overlapping of spectra be small and the center wavelengths be close to each other in the same manner as in the first embodiment, and the distance between the center wavelengths and the spectral width are selected such as to fulfill Expression 9.

Figure 9A:
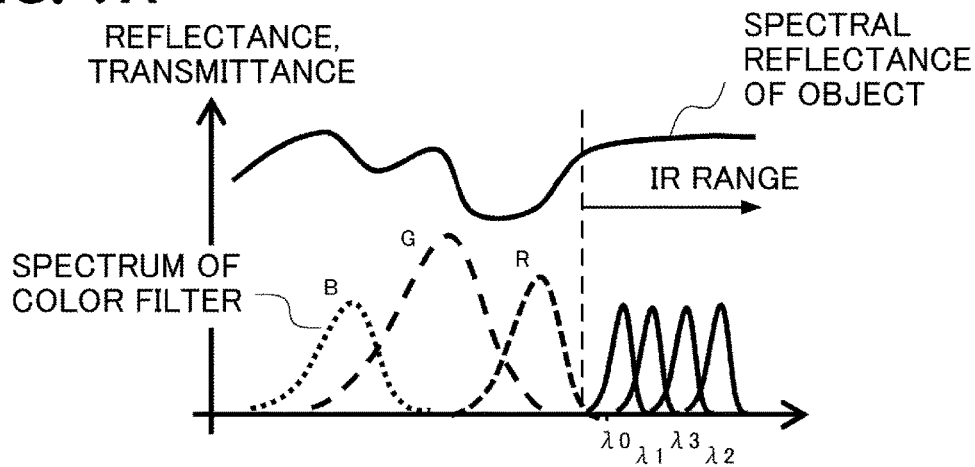
FIGS. 9A to 9D illustrate the spectral distribution of illumination light and the image capturing element in Embodiment 4.
Figure 9B:
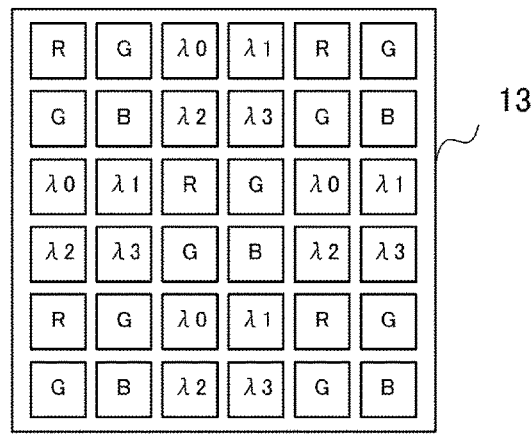

As depicted in FIG. 9A, the image capturing element 13 has color filters with narrow spectra in which the center wavelengths (λ0 to λ3) corresponding to the illumination light sources are in the near-infrared region, and color filters with RGB spectra in the visible region. The arrangement of color filters is such, as depicted in FIG. 9B, that RGB filters constituted of 4 pixels with the Bayer arrangement and IR filters constituted by 4 pixels with the center wavelengths λ0 to λ0 are arranged alternately. As a result, both the RGB color filter and the near-infrared time-correlation image can be acquired with a high resolution.

Figure 9C:
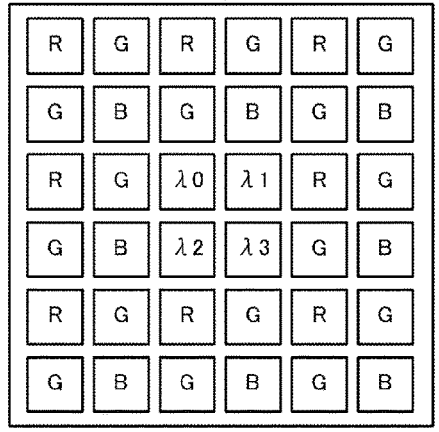
Figure 9D:
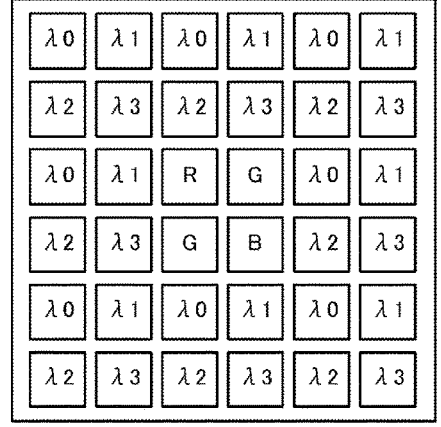

However, it is not necessary that the ratio of the RGB filters and IR filters be the same. For example, a filter arrangement for acquiring RGB color images with a high resolution may be obtained by increasing the number of the arranged RGB filters relative to that of the IR filters as depicted in FIG. 9C. Alternatively, it is possible to increase, conversely, the number of the IR filters relative to that of RGB filters, as depicted in FIG. 9D, to obtain a filter arrangement for acquiring time-correlation images with a high resolution. The arranged of the center wavelengths of the RGB filters and IR filters and the ratio of the number of filters are not limited to those depicted in FIGS. 9B to 9D.

A method for acquiring images by division into a plurality of wavelength bands within the plane of the image capturing element is explained hereinabove as a method for acquiring visible light and near-infrared radiation at the same time, but a method using the separation in the depth direction of the image capturing element, a time division method, and a configuration with a plurality of image capturing elements can be also used.

When separation is performed in the depth direction of the image capturing element, visible light and near-infrared radiation can be acquired at the same time, for example, by stacking a layer that performs photoelectric conversion of a visible wavelength and a layer that performs photoelectric conversion of an infrared wavelength separately from each other in the thickness direction. The effect obtained in this case is that the decrease in resolution is prevented as compared with the case in which a plurality of filters are arranged in a plane.

With the time division method, the visible wavelength and infrared wavelength are separately acquired by performing imaging by switching a visible-light-cut filter and an infrared-cut filter. The effect obtained in this case is that the decrease in resolution is prevented as compared with the case in which a plurality of filters are arranged in a plane.

Where a plurality of image capturing elements is used, an image is acquired with separate image capturing elements separately for the light of each wavelength. In this case, high-resolution imaging can be performed for each wavelength, but the number of image capturing elements is increased and the device is increased in size. Therefore, it is preferred that two image capturing elements be used separately for the visible and near-infrared ranges to acquire images in the respective wavelength bands.

The effect attained with the configuration of the present embodiment is that motion information can be acquired by using a time-correlation image in the invisible range and, at the same time, the usual RGB color image can be acquired.

In the example explained herein, the first embodiment in which the center wavelengths of the illumination light rays are arranged within a narrow wavelength band is modified and the center wavelengths are set in the invisible region while maintaining this condition. However, the illumination light rays may be also set into the invisible region in the second embodiment in which the center wavelengths of the illumination light rays are arranged apart from each other. Further, in the example explained herein the center wavelengths of the illumination light rays are set into the near-infrared region, but the center wavelengths of the illumination light rays may be also set into the ultraviolet region (for example, 200 nm to 380 nm).

Fifth Embodiment

The fifth embodiment of the present invention is explained hereinbelow. In the fifth embodiment, the number of the time-correlation images which is to be acquired is different. Since the configuration of the image capturing device 1 is the same as that in the first embodiment, the explanation below uses the same reference numerals.

In the present embodiment, the number of wavelengths of the illumination light sources in the lighting device 10 is by two wavelengths larger than that in the first embodiment. The additional center wavelengths of the illumination light sources are denoted by λ4 and λ5. The number of the inputted reference signals is also increased by two. The two additional reference signals are a sin wave and a cos wave, in the same manner as in the first embodiment, but the frequency is different. For example, the reference signals $\sin(2\omega t)$ and $\cos(2\omega t)$ are inputted. As a result, information on the motion in a wider range can be acquired. The ratio of the two modulation frequencies is not required to be 1:2, and any ratio may be used. However, since any modulated signal needs to include only an integer wavelength during the exposure time, it is preferred that the least common multiple of the two modulation frequencies be not very large.

The image capturing element 13 is configured to have additionally color filters corresponding to the two additional illumination light sources λ4, λ5. The images obtained with the color filters corresponding to λ4, λ5 are taken as time-correlation images $I_{\lambda 4}$, $I_{\lambda 5}$ determined by $\sin(2\omega t)$ and $\cos(2\omega t)$, respectively. In the image processing unit 15, the intensity image $I_{\lambda 1}$ obtained under constant-value illumination and the time-correlation images $I_{\lambda 0}$, $I_{\lambda 2}$, $I_{\lambda 4}$, $I_{\lambda 5}$ are corrected using the image $I_{\lambda 3}$ obtained without the illumination.

In the motion computation unit 17, the motion information acquisition processing is performed twice. The first motion information acquisition processing uses the intensity image $I_{\lambda 1}$ and the time-correlation images $I_{\lambda 0}$, $I_{\lambda 2}$, and the second motion information acquisition processing uses the intensity image $I_{\lambda 1}$ and the time-correlation images $I_{\lambda 4}$, $I_{\lambda 5}$. The motion computation unit 17 also compares the acquired motion information of two types at the respective corresponding pixel positions and selects the motion information with a larger motion for each pixel as the motion information in this pixel. As a result, motion information obtained from different modulation frequencies can be combined together. The combined motion information is stored in the storage unit 20.

With the configuration of the present embodiment, the time-correlation images obtained with the reference signals formed by combinations of two phases and two frequencies can be acquired at the same time. Further, the effect obtained by using the reference signals formed by a pair of sin wave and cos wave of different frequencies is that the acquisition of different motion amounts is made possible and information on the motion in a wider range can be acquired.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-46251, filed on Mar. 9, 2015, which is hereby incorporated by reference herein in its entirety.

What is claimed is:

1. A motion information acquiring apparatus comprising:
a lighting device configured to illuminate an object at the same time with first intensity-modulated light, second intensity-modulated light, and constant illumination light, wherein the first intensity-modulated light has a first center wavelength and is intensity-modulated with a first reference signal, the second intensity-modulated light has a second center wavelength and is intensity-modulated with a second reference signal that has substantially the same wavelength as the first reference signal, but a different phase, and the constant illumination light has a third center wavelength and a constant intensity, wherein the first and second reference signals have an integer number of periods during an exposure period;
an image generator configured to generate a first image corresponding to the first intensity-modulated light, a second image corresponding to the second intensity-modulated light, and a third image corresponding to the constant illumination light simultaneously during the exposure period; and
a motion information acquirer configured to acquire motion information in the images on the basis of the first to third images generated by the image generator.

2. The motion information acquiring apparatus according to claim 1, wherein the first reference signal and the second reference signal are two sine waves having substantially identical frequencies and a difference in phase at the start of exposure of 60° to 120°, and a change between the phase difference at the start of exposure and the phase difference at the end of exposure is −30° to 30°.

3. The motion information acquiring apparatus according to claim 1, wherein the lighting device adjusts the frequencies of the first reference signal and the second reference signal such that the number of periods of the first reference signal and the second reference signal included in an exposure period of time is an integer.

4. The motion information acquiring apparatus according to claim 1, wherein the lighting device adjusts the exposure period of time such that the number of periods of the first reference signal and the second reference signal included in the exposure period of time is an integer.

5. The motion information acquiring apparatus according to claim 1, wherein the lighting device determines the frequencies of the first reference signal and the second reference signal according to the speed of the object.

6. The motion information acquiring apparatus according to claim 1,
wherein the image generator also generates an environmental light image which is an image that does not include illumination light from the lighting device, and
wherein the motion information acquirer acquires motion information from the first to third images and the environmental light image.

7. The motion information acquiring apparatus according to claim 6,
wherein the image generator generates the environmental light image corresponding to environmental light having a fourth center wavelength and a predetermined spectral distribution, and wherein a distance between adjacent center wavelengths in the first to fourth center wavelengths is within 50 nm.

8. The motion information acquiring apparatus according to claim 7, wherein the distance between the center wavelengths with respect to two light rays with adjacent center wavelengths, among the first intensity-modulated light, the second intensity-modulate light, the constant illumination light, and the environmental light, is larger than a sum of half width at half maximum of the spectral distribution of one light and half width at half maximum of the spectral distribution of the other light.

9. The motion information acquiring apparatus according to claim 7, further comprising:
an image capturing element including color filters having center wavelengths and spectral distributions substantially the same as those of the first intensity-modulated light, the second intensity-modulate light, the constant illumination light, and the environmental light; and
the image generator generates the first to third mages and the environmental light image in a single imaging operation.

10. The motion information acquiring apparatus according to claim 6,
wherein a distance between adjacent center wavelengths in the first to third center wavelengths is greater than 50 nm, and
wherein the image generator acquires three environmental light images corresponding to first to third environmental light rays each having a center wavelength within 50 nm from the respective first to third center wavelengths and a predetermined spectral distribution.

11. The motion information acquiring apparatus according to claim 10, wherein the distance between center wavelengths with respect to each combination of the first intensity-modulated light and the first environmental light, the second intensity-modulate light and the second environmental light, and the constant illumination light and the third environmental light is larger than a sum of half width at half maximum of the spectral distribution of one light and half width at half maximum of the spectral distribution of the other light.

12. The motion information acquiring apparatus according to claim 10, further comprising:
an image capturing element including color filters having center wavelengths and spectral distributions substantially the same as those of the first intensity-modulated light, the second intensity-modulate light, the constant illumination light, and the first to third environmental light rays; and
the image generator generates the first to third images and three environmental light images corresponding to the first to third environmental light rays in a single imaging operation.

13. The motion information acquiring apparatus according to claim 10,
wherein the center wavelengths of the first to third environmental light rays are substantially the same as the first to third center wavelengths, respectively, and
wherein the image generator generates the first to third images by performing imaging while performing illumination with the lighting device and generates the three environmental light images corresponding to the first to third environmental light rays by performing imaging without performing illumination with the lighting device.

14. The motion information acquiring apparatus according to claim 1, wherein the spectral distributions of the first intensity-modulated light, the second intensity-modulate light, and the constant illumination light are all in an invisible range.

15. The motion information acquiring apparatus according to claim 14, wherein the spectral distributions of the first intensity-modulated light, the second intensity-modulate light, and the constant illumination light are all in a range from 750 nm to 1.4 µm.

16. The motion information acquiring apparatus according to claim 14, further comprising an image capturing element including color filters corresponding to the first intensity modulated light, the second intensity-modulate light, and the constant illumination light and a color filter for acquiring a color image.

17. The motion information acquiring apparatus according to claim 1,
wherein the lighting device further emits third intensity-modulated light and fourth intensity-modulated light,
wherein the third intensity-modulated light has a fifth center wavelength and is intensity-modulated with a third reference signal, and the fourth intensity-modulated light has a sixth center wavelength and is intensity-modulated with a fourth reference signal that has substantially the same wavelength as the third reference signal, but a different phase;
the frequencies of the third and fourth reference signals are different from the frequencies of the first and second reference signals;
the image generator also generates fourth and fifth images corresponding to the third intensity-modulated light and the fourth intensity-modulated light; and
the motion information acquirer acquires motion information in the images on the basis of the first to fifth images generated by the image generator.

18. The motion information acquiring apparatus according to claim 17, wherein the motion information acquirer determines motion information based on the first to third mages and motion information based on the third to fifth images and takes, for each pixel, motion information with a larger motion as motion information on the pixel.

19. A motion information acquiring method performed by a motion information acquiring apparatus, the method comprising:
an illumination step for illuminating an object at the same time with first intensity-modulated light, second intensity-modulated light, and constant illumination light, wherein the first intensity-modulated light has a first center wavelength and is intensity-modulated with a first reference signal, the second intensity-modulated light has a second center wavelength and is intensity-modulated with a second reference signal that has substantially the same wavelength as the first reference signal, but a different phase, and the constant illumination light has a third center wavelength and a constant intensity, wherein the first and second reference signals have an integer number of periods during an exposure period;
an image generation step for performing imaging, while illuminating the object with the first intensity-modulated light, the second intensity-modulated light, and the constant illumination light, and generating a first image corresponding to the first intensity-modulated light, a second image corresponding to the second intensity-modulated light, and a third image corresponding to the constant illumination light simultaneously during the exposure period; and a motion information acquisition step for acquiring motion information in the images on the basis of the first to third images generated in the image generation step.

20. A non-transitory computer readable medium storing a program causing a computer to execute a process comprising:

an illumination step for illuminating an object at the same time with first intensity-modulated light, second intensity-modulated light, and constant illumination light, wherein the first intensity-modulated light has a first center wavelength and is intensity-modulated with a first reference signal, the second intensity-modulated light has a second center wavelength and is intensity-modulated with a second reference signal that has substantially the same wavelength as the first reference signal, but a different phase, and the constant illumination light has a third center wavelength and a constant intensity, wherein the first and second reference signals have an integer number of periods during an exposure period;

an image generation step for performing imaging, while illuminating the object with the first intensity-modulated light, the second intensity-modulated light, and the constant illumination light, and generating a first image corresponding to the first intensity-modulated light, a second image corresponding to the second intensity-modulated light, and a third image corresponding to the constant illumination light simultaneously during the exposure period; and a motion information acquisition step for acquiring motion information in the images on the basis of the first to third images generated in the image generation step.

* * * * *